(12) United States Patent
Xie et al.

(10) Patent No.: US 11,227,395 B2
(45) Date of Patent: Jan. 18, 2022

(54) METHOD AND APPARATUS FOR DETERMINING MOTION VECTOR FIELD, DEVICE, STORAGE MEDIUM AND VEHICLE

(71) Applicant: BAIDU ONLINE NETWORK TECHNOLOGY (BEIJING) CO., LTD., Beijing (CN)

(72) Inventors: Yuanfan Xie, Beijing (CN); Liang Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 147 days.

(21) Appl. No.: 16/563,538

(22) Filed: Sep. 6, 2019

(65) Prior Publication Data

US 2020/0082547 A1 Mar. 12, 2020

(30) Foreign Application Priority Data

Sep. 7, 2018 (CN) .......................... 201811043746.5

(51) Int. Cl.
*G06T 7/246* (2017.01)

(52) U.S. Cl.
CPC .... *G06T 7/246* (2017.01); *G06T 2207/10016* (2013.01); *G06T 2207/10028* (2013.01); *G06T 2207/10044* (2013.01)

(58) Field of Classification Search
None
See application file for complete search history.

(56) References Cited

U.S. PATENT DOCUMENTS

2002/0032515 A1* 3/2002 Nakamura ......... B60K 31/0008
701/96
2005/0278098 A1 12/2005 Breed
(Continued)

FOREIGN PATENT DOCUMENTS

CN 1415105 A 4/2003
CN 103176185 A 6/2013
(Continued)

OTHER PUBLICATIONS

Matzka, S. "Efficient Resource Allocation for Automotive Active Vision Systems", PhD Thesis, Heriot-Watt Univ. Oct. 2009, 296 pages.
(Continued)

*Primary Examiner* — Matthew C Bella
*Assistant Examiner* — Brian D Shin
(74) *Attorney, Agent, or Firm* — Lathrop GPM LLP (57) ABSTRACT

A method for determining a motion vector field is provided, comprising: determining an optical flow of a spatial point in a scene according to different frames of images acquired by an image acquisition unit; determining a movement velocity of the spatial point in a coordinate system of the image acquisition unit according to spatial point data; determining a first order derivative of a projection of the spatial point on an image plane according to the spatial point data; and determining a velocity vector of the spatial point according to intrinsic parameters, a rotation matrix in a global coordinate system, a movement velocity, and an angular velocity, of the image acquisition unit, as well as a pose, the optical flow, the movement velocity in the coordinate system of the image acquisition unit, and the first order derivative of the projection on the image plane, of the spatial point.

9 Claims, 3 Drawing Sheets

(56) References Cited

U.S. PATENT DOCUMENTS

| | | | |
|---|---|---|---|
| 2006/0257042 A1 | 11/2006 | Ofek et al. | |
| 2009/0169052 A1* | 7/2009 | Seki | G06T 7/74 382/103 |
| 2011/0169957 A1* | 7/2011 | Bartz | G06T 1/0007 348/149 |
| 2011/0182146 A1* | 7/2011 | Scoca | G01S 13/605 367/89 |
| 2014/0168461 A1* | 6/2014 | Dani | G06T 7/246 348/222.1 |
| 2016/0232410 A1* | 8/2016 | Kelly | G08G 1/054 |
| 2017/0161561 A1* | 6/2017 | Marty | H04N 5/23238 |
| 2017/0337434 A1 | 11/2017 | Cui et al. | |

FOREIGN PATENT DOCUMENTS

| | | |
|---|---|---|
| CN | 107111879 A | 8/2017 |
| CN | 107193011 A | 9/2017 |
| JP | 2008186246 A | 8/2008 |
| JP | 2016148521 A | 8/2016 |
| WO | WO 0148695 A1 | 7/2001 |
| WO | WO 01048695 A1 | 7/2001 |
| WO | WO 2017057042 A1 | 4/2017 |

OTHER PUBLICATIONS

European Patent Application No. 19195800.8 extended Search and Opinion dated Feb. 14, 2020, 8 pages.
Chinese Patent Application No. 201811043746.5 Office Action dated Jun. 19, 2020, 8 pages.
Chinese Patent Application No. 201811043746.5 English translation of Office Action dated Jun. 19, 2020, 6 pages.
Japanese Patent Application No. 2019163318 Office Action dated Sep. 8, 2020, 2 pages.
Japanese Patent Application No. 2019163318 English translation of Office Action dated Sep. 8, 2020, 2 pages.
Wang, K. et al.; Deep learning in driverless vehicles; CAAI Transactions on Intelligent Systems, vol. 13, No. 1; Feb. 2018; pp. 55-69.
Lu, D. et al. A Vehicle Detection and Tracking Method Based on Range Data, J. of Transportation Systems Engineering, vol. 18, No. 3; Jun. 2018; pp. 55-62.
Study on detection of Ahead Vehicle Based on Millimeter-Wave Radar-vision,(2013) pp. 1-15, 47-55, and 60.

* cited by examiner

METHOD AND APPARATUS FOR DETERMINING MOTION VECTOR FIELD, DEVICE, STORAGE MEDIUM AND VEHICLE

CROSS REFERENCE TO RELATED APPLICATION

This application claims priority to Chinese Patent Application No. 201811043746.5, filed with the State Intellectual Property Office of P. R. China on Sep. 7, 2018, the entire contents of which are incorporated herein by reference.

TECHNICAL FIELD

The present disclosure relates to the field of image processing technology, and more particularly, to a method and an apparatus for determining a motion vector field, a device, a storage medium and a vehicle.

BACKGROUND

With recent development in science and technology, techniques for acquiring, analyzing and estimating movement state of an object in a scene are used in more and more technological fields. For example, in the field of unmanned driving, radars, cameras, satellite positioning devices, autonomous navigation devices and various other sensors, or the like, may be integrated in an unmanned vehicle. The unmanned vehicle may perform positioning autonomously, determine a navigation route, recognize information such as traffic signs and road conditions or the like automatically, and may be driven to a destination address safely based on a large amount of data information. Thus, it is important for the unmanned vehicle to be able to estimate the movement state of the object in the external scene, in order to improve safety of the unmanned vehicle.

SUMMARY

Embodiments of the present disclosure provide a method and an apparatus for determining a motion vector field, a device, a storage medium and a vehicle, capable of determining an actual motion vector field of a spatial point in a scene and improving the accuracy of estimation for a motion vector field.

A first aspect of the present disclosure provides a method for determining the motion vector field, comprising: determining an optical flow of a spatial point in a scene according to different frames of images acquired by an image acquisition unit; determining a movement velocity of the spatial point in the scene in a coordinate system of the image acquisition unit according to spatial point data acquired by a radar; determining a first order derivative of a projection of the spatial point on an image plane according to the spatial point data acquired by the radar; and determining a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane.

A second aspect of the present disclosure provides an apparatus for determining the motion vector field comprising an optical flow determining module, a velocity determining module, a derivative determining module and a velocity vector determining module.

The optical flow determining module is configured to determine an optical flow of a spatial point in a scene according to different frames of images acquired by an image acquisition unit.

The velocity determining module is configured to determine a movement velocity of the spatial point in the scene in a coordinate system of the image acquisition unit according to spatial point data acquired by a radar.

The derivative determining module is configured to determine a first order derivative of a projection of the spatial point on an image plane according to the spatial point data acquired by the radar.

The velocity vector determining module is configured to determine a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane.

A third aspect of the present disclosure provides a device, comprising: one or more processors; and a memory configured to store one or more programs, wherein when the one or more programs are executed by the one or more processors, the one or more processors are configured to implement the method for determining the motion vector field according to any one of embodiments of the present disclosure.

A fourth aspect of the present disclosure provides a computer readable storage medium having a computer program stored thereon, wherein, when the program is executed by a processor, the program implements the method for determining the motion vector field according to any one of embodiments of the present disclosure.

A fifth aspect of the present disclosure provides a vehicle, comprising a vehicle body, wherein, the device any one of embodiments of the present disclosure, and an image acquisition unit and a laser radar which are communicatively connected with the device, are disposed in the vehicle body.

The embodiments of the present disclosure acquires different frames of images at different time points by an image acquisition unit in real time or periodically, determines an optical flow of a spatial point in a scene according to the different frames of images, and at the same time, determines a movement velocity of the spatial point in a coordinate system of the image acquisition unit and a first order derivative of a projection of the spatial point on an image plane according to spatial point data in the scene acquired by a radar, and finally determines a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane. In the embodiments of the present disclosure, the spatial point in a two-dimensional image may be converted into a three-dimensional configuration, according to the optical flow in combination with depth information of images acquired by the radar. Then, by determining the movement velocities of the spatial point in a two-dimensional scene from different angles, the actual motion vector field of the space point in the scene may be determined based on an equivalence relation among those movement velocities, thereby improving the accuracy of estimation for the motion vector field.

DETAILED DESCRIPTION

The present disclosure will be described in details below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

In the related art, an image acquisition device, such as a video camera or a camera, is used to acquire scene images at different time points. Further, a feature matching algorithm is used to determine the same object in the scene images at different time points, so as to calculate a movement velocity of the object is calculated according to moving distances and time differences of the same object among the scene images, and to determine a moving direction of the object.

However, in the related art, the movement state of the object is estimated based on an image. The same movement state in the image may be different in real scenarios. Accordingly, in the related art, an absolute movement state of the object in a real scenario could not be determined, resulting in a very low accuracy of estimation for a motion vector field.

First Embodiment

Figure 1:
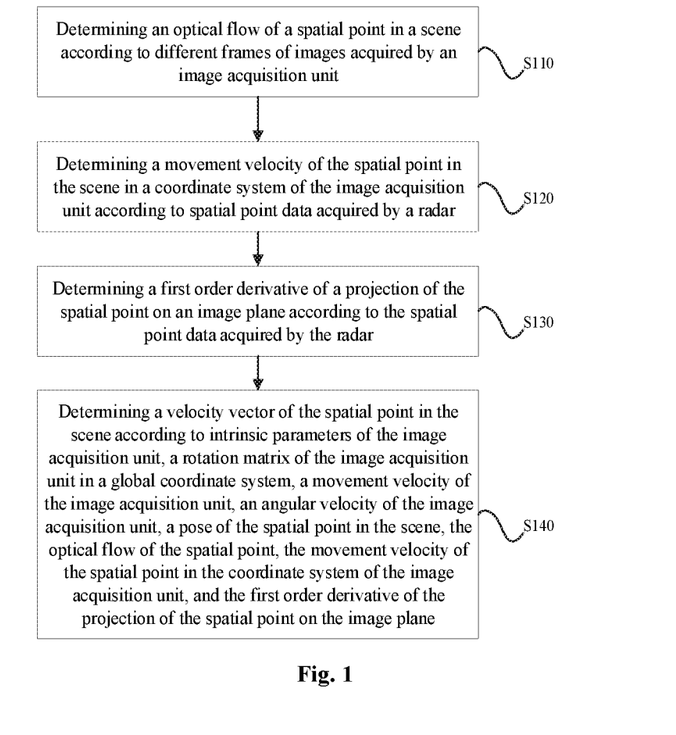
FIG. 1 is a flow chart of a method for determining a motion vector field according to a first embodiment of the present disclosure.

FIG. 1 is a flow chart of a method for determining a motion vector field according to a first embodiment of the present disclosure. The embodiment may be applicable to a case of estimating a motion vector field of a spatial point in a scene. The method may be executed by an apparatus for determining the motion vector field. The method specifically comprises the following steps.

At step S110, an optical flow of a spatial point in a scene is determined according to different frames of images acquired by an image acquisition unit.

In specific embodiments of the present disclosure, the image acquisition unit refers to image acquisition devices such as a webcam, a camera, a video camera, or the like, which may acquire subsequent frames of images in real time or periodically. The scene refers to an object to be acquired in an image, and may contain an object that is in a relative moving state or a relative static state. The spatial point refers to a feature point constituting the object in the scene that may be obtained by means of feature extraction or the like. The optical flow refers to an instantaneous velocity of pixel motion on an observing imaging plane for an moving object in space, and is a two-dimensional projection of a velocity vector on an image for the motion of an object in a three-dimensional real world. The optical flow may be used for determining a corresponding relationship between a current frame and a previous frame according to a change of the pixel in an image sequence in time domain and a correlation between adjacent frames, and calculating motion information between the adjacent frames. In the embodiments, the method for determining the feature point and the method for calculating the optical flow are not limited, and may be implemented with any method capable of determining the feature point in the scene and any method capable of calculating the optical flow.

In certain embodiments, the image acquisition unit may perform an image acquisition. With the different frames of images acquired, the optical flow of the spatial point in the scene may be calculated by using two or more adjacent frames of images. Specifically, in a scenario of an unmanned vehicle, the image acquisition unit may be mounted on a circumference of the unmanned vehicle, such as a front end and/or a back end, for perceiving the environment surrounding the unmanned vehicle so that scene images in a moving direction may be acquired when the unmanned vehicle is in a static state or in a moving state, in order to obtain image information about the surrounding environment and to analyze road conditions. Accordingly, after acquiring the different frames of images, the optical flow of the spatial point in the scene, i.e., the two-dimensional projection of the velocity vector on an image for the motion of the spatial point in the three-dimensional real world that includes a movement velocity and a movement direction of the projection on the image, may be calculated by using the adjacent frames of images.

At step S120, a movement velocity of the spatial point in the scene in a coordinate system of the image acquisition unit is determined according to spatial point data acquired by a radar.

In specific embodiments of the present disclosure, the radar refers to an electronic device for detecting a target with electromagnetic waves. The radar may emit the electromagnetic waves to illuminate the target and receive echoes from the target, so as to determine information such as a distance between the target and the emitting point of the electromagnetic waves, a rate of change in the distance, a radial velocity, an orientation, a height, or the like according to information such as a change in frequency and a time difference between the emitted waves and the echoes wave. The spatial point data acquired by the radar may include multi-dimensional information, such as three-dimensional coordinate information, color information, grayscale information, depth information, of the spatial point in a global coordinate system. The coordinate system of the image acquisition unit may be a three-dimensional rectangular coordinate system established by taking a center of focus of a pinhole camera model as an origin, taking an optical axis of the image acquisition unit as the Z-axis, and having the X-axis and the Y-axis that are generally parallel to the X-axis and the Y-axis in a physical coordinate system of the image. Accordingly, specific position information of each spatial point in the scene may be represented in the coordinate system of the image acquisition unit. A relationship between the coordinate system of the image acquisition unit and the global coordinate system may be defined by a rotation matrix and a translation vector.

Specifically, the radar used in the unmanned vehicle may be classified into a millimeter wave radar and a laser radar. When the millimeter wave radar is adopted, the movement velocity of the spatial point in the global coordinate system may be determined according to data from a millimeter wave radar at different time points. Then, the movement velocity of the spatial point in the global coordinate system may be converted into the movement velocity in the coordinate system of the image acquisition unit according to a relative pose between the millimeter wave radar and the image acquisition unit. When the laser radar is adopted, point cloud data of the spatial point may be projected onto the image plane according to a relative pose between the laser radar and the image acquisition unit, to obtain a depth image. Then, the movement velocity of the spatial point in the coordinate system of the image acquisition unit is obtained according to the depth images at different time points.

At step S130, a first order derivative of a projection of the spatial point on an image plane is determined according to the spatial point data acquired by the radar.

In specifics embodiment of the present disclosure, the spatial point data acquired by the radar refers to a position relationship of spatial points in a three-dimensional space. When the points in the three-dimensional space are projected onto a two-dimensional plane, a two-dimensional image represented by pixels may be obtained. Then, the first order derivative of the projection of the spatial point on the image plane may be determined.

At step S140, a velocity vector of the spatial point in the scene is determined according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane.

In specific embodiments of the present disclosure, the intrinsic parameters of the image acquisition unit refer to parameters related to characteristics of the image acquisition unit per se, such as a focal length, a principal point, and a tilt parameter of a coordinate axis of the image acquisition unit, and may be represented by an internal parameter matrix. The rotation matrix of the image acquisition unit in a global coordinate system may be understood as a coordinate system orientation relationship between the image acquisition unit and the global coordinate system. The movement velocity of the image acquisition unit refers to an instantaneous linear velocity of the image acquisition unit. When the image acquisition unit make a curvilinear motion, the angular velocity of the image acquisition unit may also be used to describe the movement state of the image acquisition unit. Both the movement velocity and the angular velocity of the image acquisition unit may be detected by an inertial navigation system integrated in the unmanned vehicle. The pose of the spatial point in the scene refers to a six-degree-of-freedom data of the space point acquired by the radar. Each of the above parameters may be detected by respective sensors in the unmanned vehicle.

It is understood that, each of the optical flow of the spatial point, the movement velocity of the spatial point in the coordinate system of the image acquisition unit, and the first order derivative of the projection of the spatial point on the image plane represents the movement velocity of the space point in the two-dimensional plane from a different aspect. Accordingly, the velocity vector of the space point may be obtained according to an equivalence relation of the above three parameters.

Alternatively, in the embodiments, the velocity vector of the spatial point in the scene may be determined by using the following simultaneous equations:

$$\frac{dU}{dt} = J \cdot K \cdot R \cdot (V_{cam}^{global} - [\omega_{cam}^{global}]_\times \cdot X) = J \cdot K \cdot R \cdot V_{obj},$$

$$R^T \cdot \frac{dY}{dt} + V_{cam}^{global} - [\omega_{cam}^{global}]_\times \cdot X = V_{obj},$$

where, K represents an intrinsic parameter of the image acquisition unit, R represents the rotation matrix of the image acquisition unit in the global coordinate system, $V_{cam}^{global}$ represents the movement velocity of the image acquisition unit, $\omega_{cam}^{global}$ represents the angular velocity of the image acquisition unit, X represents the pose of the spatial point in the scene, $$\frac{dU}{dt}$$

represents the optical flow of the spatial point, $$\frac{dY}{dt}$$

represents the movement velocity of the spatial point in the coordinate system of the image acquisition unit, J represents the first order derivative of the projection of the spatial point on the image plane, $[\ ]_x$ represents an inverse symmetric matrix operation, and $V_{obj}$ represents the velocity vector of the spatial point in the scene.

The embodiments of the present disclosure acquires different frames of images at different time points by an image acquisition unit in real time or periodically, determines an optical flow of a spatial point in a scene according to the different frames of images, and at the same time, determines a movement velocity of the spatial point in a coordinate system of the image acquisition unit and a first order derivative of a projection of the spatial point on an image plane according to spatial point data in the scene acquired by a radar, and finally determines a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane. In the embodiments of the present disclosure, the spatial point in a two-dimensional image may be converted into a three-dimensional configuration, according to the optical flow in combination with depth information of images acquired by the radar. Then, by determining the movement velocities of the spatial point in a two-dimensional scene from different aspects, the actual motion vector field of the space point in the scene may be determined based on an equivalence relation among those movement velocities, thereby improving the accuracy of estimation for the motion vector field.

Second Embodiment

Figure 2:
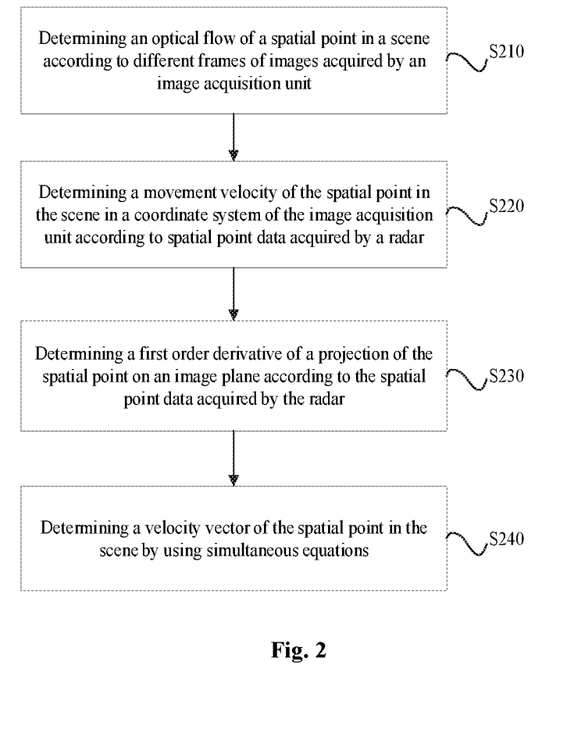
FIG. 2 is a flow chart of a method for determining a motion vector field according to a second embodiment of the present disclosure.

This embodiment provides a preferable implementation of the method for determining the motion vector field on the basis of the first embodiment as described above, which is capable of calculating the velocity vector of the spatial point according to equations. FIG. 2 is a flow chart of the method for determining the motion vector field according to the second embodiment of the present disclosure. As illustrated in FIG. 2, the method specifically comprises the following steps.

At step S210, an optical flow of a spatial point in a scene is determined according to different frames of images acquired by an image acquisition unit.

In specific embodiments of the present disclosure, the image acquisition unit may perform an image acquisition. With different frames of images acquired, the optical flow of the spatial point in the scene may be calculated by using two or more adjacent frames. Calculation methods for the optical flow in the image may include a region-based or a feature-based matching method, a frequency-domain-based method and a gradient-based method. In the embodiments, the method for calculating the optical flow are not limited, and may be implemented with any method for calculating information about the optical flow in the image. Assuming that position information in a two-dimensional space is represented by $U=[u,v]^T$, the optical flow of the spatial point may be represented by $$\frac{dU}{dt}.$$

At step S220, a movement velocity of the spatial point in the scene in a coordinate system of the image acquisition unit is determined according to spatial point data acquired by a radar.

In specific embodiments of the present disclosure, the spatial point data may be acquired by the radar. Assuming that position information of the spatial point in a three-dimensional space in the acquired spatial point data is X, extrinsic parameters of the image acquisition unit at least includes a rotation matrix $R_{cam}$ and a translation vector $T_{cam}$, wherein, the rotation matrix $R_{cam}$ indicates a direction of the coordinate axis of the global coordinate system with respect to the coordinate axis of the image acquisition unit, and the translation vector $T_{cam}$ indicates a position of an origin in the space in the global coordinate system of the image acquisition unit. Considering that the relationship between the coordinate system of the image acquisition unit Y and the global coordinate system X may be defined by the rotation matrix and the translation vector, the position information Y of the spatial point in the three-dimensional space in the coordinate system of the image acquisition unit may be represented by $Y=R_{cam}\cdot X+T_{cam}$. Then, the movement velocity $$\frac{dY}{dt}$$

of the space point in the scene in the coordinate system of the image acquisition unit may be obtained.

Alternatively, the movement velocity of the spatial point in the global coordinate system may be determined according to data from a millimeter wave radar at different time points; and the movement velocity of the spatial point in the global coordinate system may be converted into the movement velocity in the coordinate system of the image acquisition unit according to a relative pose between the millimeter wave radar and the image acquisition unit.

In specific embodiments of the present disclosure, the millimeter wave radar may be used to determine the movement velocity of the spatial point in the coordinate system of the image acquisition unit. Specifically, the millimeter wave radar may directly detect and obtain the movement velocity of the space point in the global coordinate system. Then, the movement velocity of the spatial point in the global coordinate system may be converted into the movement velocity in the coordinate system of the image acquisition unit according to a relative pose between the millimeter wave radar and the image acquisition unit.

Alternatively, point cloud data of the spatial point may be projected onto the image plane according to a relative pose between a laser radar and the image acquisition unit, to obtain a depth image; and the movement velocity of the spatial point in the coordinate system of the image acquisition unit may be obtained according to the depth images at different time points.

In specific embodiments of the present disclosure, the laser radar may be used to determine the movement velocity of the space point in the coordinate system of the image acquisition unit. Specifically, when the laser radar is adopted, it may detect the point cloud data of the spatial point. Then, the point cloud data of the spatial point may be projected onto the image plane according to the relative pose, i.e. the rotation matrix and the translation vector, between the laser radar and the image acquisition unit, to obtain the depth image. In the depth image, a value of each pixel represents a distance between the object and a plane formed by the X-axis and Y-axis in the coordinate system of the image acquisition system. Accordingly, the movement velocity of the spatial point in the coordinate system of the image acquisition unit may be obtained according to the depth images at different time points. It should be noted that, the embodiment may alternatively adopt image acquisition devices capable of detecting depth information of an image, such as a depth camera or an industrial camera, to obtain the depth information of the image.

At step S230, a first order derivative of a projection of the spatial point on an image plane is determined according to the spatial point data acquired by the radar.

In specific embodiments of the present disclosure, the spatial point data acquired by the radar refers to a position relationship of spatial point in a three-dimensional space. By mapping a point in the three-dimensional space onto a two-dimensional plane, a two-dimensional image represented by pixels may be obtained. Then, the first order derivative of the projection of the spatial point on the image plane may be obtained. Specifically, assuming that the first order derivative is represented by J, the space point in the three-dimensional space in the global coordinate system X may be converted into $Y=[x,y,z]^T$ in the coordinate system of the image acquisition unit by an equation: $Y=R_{cam}\cdot X+T_{cam}$. The space point in the two-dimensional space may be represented by $A=[u,v]^T$ in a physical coordinate system of the image. Assuming that there is an intermediate variable $Z=K\cdot Y$, where $$K = \begin{bmatrix} f_u & s & u_0 \\ 0 & f_v & v_0 \\ 0 & 0 & 1 \end{bmatrix}$$

represents intrinsic parameters of the image acquisition unit, $f_u$ and $f_v$ represent focal lengths of the image acquisition unit on an abscissa axis and an ordinate axis, respectively, and are usually equal to each other, $u_0$ and $v_0$ represent principal point with respect to the imaging plane, s represents a tilt parameter of a coordinate axis and is zero ideally, and since $A=[z_1/z_3, z_2/z_3]$, the coordinate of space point mapped into the image physical coordinate system is obtained as $[u,v]^T=[f_u\cdot x/z, f_v\cdot y/z]^T$. Assuming that $f_u=f_v=1$, the first order derivative of the projection of the spatial point on the image plane is then obtained as $$J = \frac{d[u,v]^T}{d[x,y,z]^T} = \begin{bmatrix} 1/z & 0 & -x/z^2 \\ 0 & 1/z & -y/z^2 \end{bmatrix}.$$

At step S240, a velocity vector of the spatial point in the scene is determined by using the following simultaneous equations:

$$\frac{dU}{dt} + J\cdot K\cdot R\cdot (V_{cam}^{global} - [\omega_{cam}^{global}]_\times \cdot X) = J\cdot K\cdot R\cdot V_{obj},$$

$$R^T\cdot \frac{dY}{dt} + V_{cam}^{global} - [\omega_{cam}^{global}]_\times \cdot X = V_{obj},$$

where, K represents an intrinsic parameter of the image acquisition unit, R represents the rotation matrix of the image acquisition unit in the global coordinate system, $V_{cam}^{global}$ represents the movement velocity of the image acquisition unit, $\omega_{cam}^{global}$ represents the angular velocity of the image acquisition unit, X represents the pose of the spatial point in the scene, $$\frac{dU}{dt}$$

represents the optical flow of the spatial point, $$\frac{dY}{dt}$$

represents the movement velocity of the spatial point in the coordinate system of the image acquisition unit, J represents the first order derivative of the projection of the spatial point on the image plane, $[\ ]_\times$ represents an inverse symmetric matrix operation, and $V_{obj}$ represents the velocity vector of the spatial point in the scene In specific embodiments of the present disclosure, each of the parameters of K, R, $V_{cam}^{global}$, $\omega_{cam}^{global}$, and X may be detected by respective sensors in the unmanned vehicle. It is understood that, each of the optical flow of the spatial point, the movement velocity of the spatial point in the coordinate system of the image acquisition unit, and the first order derivative of the projection of the spatial point on the image plane represents the movement velocity of the space point in the two-dimensional plane from a different aspect. Accordingly, the velocity vector of the space point may be obtained according to an equivalence relation of the above three parameters in a simultaneous manner.

The embodiments of the present disclosure calculate the optical flow of the two-dimensional image, determine the movement velocity of the spatial point in the coordinate system of the image acquisition unit according to the depth information in the spatial point data acquired by the millimeter wave radar or the laser radar, and determine the first order derivative of the projection of the spatial point on the image plane, and finally, determine the velocity vector of the spatial point in the scene by the equations, according to the intrinsic parameters of the image acquisition unit, the rotation matrix of the image acquisition unit in the global coordinate system, the movement velocity of the image acquisition unit, the angular velocity of the image acquisition unit, the pose of the spatial point in the scene, as well as the determined optical flow of the spatial point, the movement velocity of the spatial point in the coordinate system of the image acquisition unit, and the first order derivative of the projection of the spatial point on the image plane. In embodiments of the present disclosure, the spatial point in a two-dimensional image may be converted into a three-dimensional configuration, according to the optical flow in combination with depth information of images acquired by the radar. Then, by determining the movement velocities of the spatial point in a two-dimensional scene from different aspects, the actual motion vector field of the space point in the scene may be determined based on an equivalence relation among those movement velocities, thereby improving the accuracy of estimation for the motion vector field.

Third Embodiment

Figure 3:
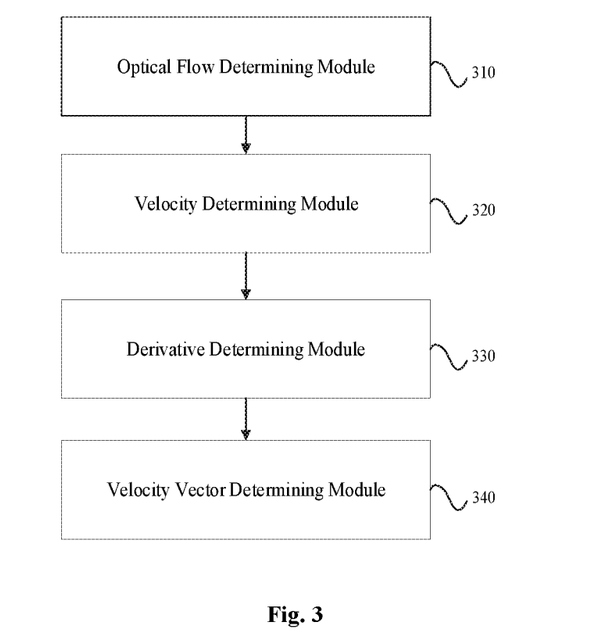
FIG. 3 is a block diagram of an apparatus for determining a motion vector field according to a third embodiment of the present disclosure.

FIG. 3 is a block diagram of an apparatus for determining a motion vector field according to a third embodiment of the present disclosure. The embodiment may be applicable to a case of estimating a motion vector field of a spatial point in a scene. The apparatus may implement the method for determining the motion vector field according to any of embodiments of the present disclosure. Specifically, the apparatus comprises an optical flow determining module 310, a velocity determining module 320, a derivative determining module 330 and a velocity vector determining module 340.

The optical flow determining module 310 is configured to determine an optical flow of a spatial point in a scene according to different frames of images acquired by an image acquisition unit.

The velocity determining module 320 is configured to determine a movement velocity of the spatial point in the scene in a coordinate system of the image acquisition unit according to spatial point data acquired by a radar.

The derivative determining module 330 is configured to determine a first order derivative of a projection of the spatial point on an image plane according to the spatial point data acquired by the radar.

The velocity vector determining module 340 is configured to determine a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane.

Alternatively, the velocity determining module 320 may comprise a velocity determining unit in the global coordinate system and a velocity determining unit in the coordinate system of the image acquisition unit.

The velocity determining unit in the global coordinate system is configure to determine a movement velocity of the spatial point in the global coordinate system according to data from a millimeter wave radar at different time points.

The velocity determining unit in the coordinate system of the image acquisition unit is configured to convert the movement velocity of the spatial point in the global coordinate system into the movement velocity in the coordinate system of the image acquisition unit according to a relative pose between the millimeter wave radar and the image acquisition unit.

Alternatively, the velocity determining module 320 may comprises a depth image determining unit and a velocity calculating unit.

The depth image determining unit is configured to project point cloud data of the spatial point onto the image plane according to a relative pose between the laser radar and the image acquisition unit, to obtain a depth image.

The velocity calculating unit is configured to obtain the movement velocity of the spatial point in the coordinate system of the image acquisition unit according to the depth images at different time points.

Alternatively, the velocity vector determining module is specifically configured to determine the velocity vector of the spatial point in the scene by using the following simultaneous equations:

$$\frac{dU}{dt} + J \cdot K \cdot R \cdot (V_{cam}^{global} - [\omega_{cam}^{global}]_\times \cdot X) = J \cdot K \cdot R \cdot V_{obj},$$

$$R^T \cdot \frac{dY}{dt} + V_{cam}^{global} - [\omega_{cam}^{global}]_\times \cdot X = V_{obj},$$

where, K represents an intrinsic parameter of the image acquisition unit, R represents the rotation matrix of the image acquisition unit in the global coordinate system, $V_{cam}^{global}$ represents the movement velocity of the image acquisition unit, $\omega_{cam}^{global}$ represents the angular velocity of the image acquisition unit, X represents the pose of the spatial point in the scene, $$\frac{dU}{dt}$$

represents the optical flow of the spatial point, $$\frac{dY}{dt}$$

represents the movement velocity of the spatial point in the coordinate system of the image acquisition unit, J represents the first order derivative of the projection of the spatial point on the image plane, $[\ ]_\times$ represents an inverse symmetric matrix operation, and $V_{obj}$ represents the velocity vector of the spatial point in the scene.

According to the technical solution of the embodiment, functions, such as acquiring the two-dimensional image, acquiring the three-dimensional information, calculating the optical flow, converting the coordinate system, calculating the movement velocity of the spatial point, projecting from the three-dimension to the two-dimension, calculating the derivative, and solving the simultaneous equations, may be implemented through a cooperation among respective functional module. In the embodiments of the present disclosure, the spatial point in a two-dimensional image may be converted into a three-dimensional configuration, according to the optical flow in combination with depth information of images acquired by the radar. Then, by determining the movement velocities of the spatial point in a two-dimensional scene from different aspects, the actual motion vector field of the space point in the scene may be determined based on an equivalence relation among those movement velocities, thereby improving the accuracy of estimation for the motion vector field.

Fourth Embodiment

Figure 4:
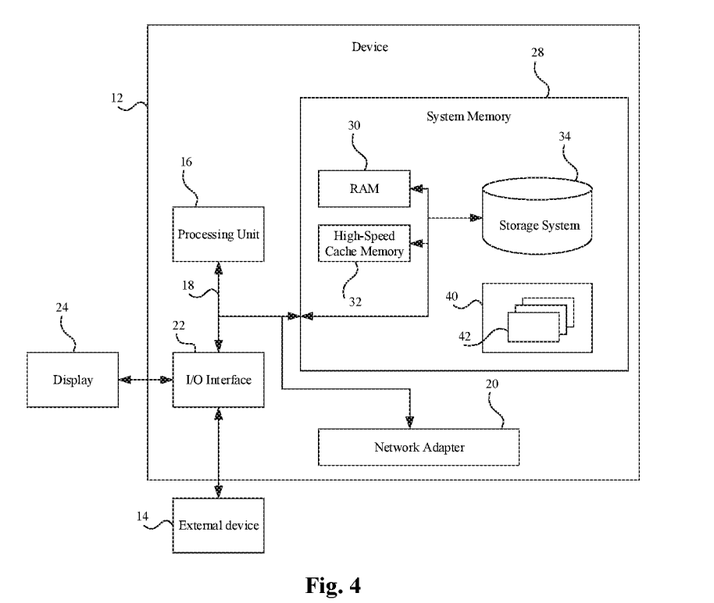
FIG. 4 is a structural schematic diagram of a device according to a fourth embodiment of the present disclosure.

FIG. 4 is a structural schematic diagram of a device according to a fourth embodiment of the present disclosure. FIG. 4 shows a block diagram of an exemplary device applicable to implement the embodiments of the present disclosure. The device illustrated in FIG. 4 is only illustrated as an example, and should not be considered as any restriction on the function and the usage range of embodiments of the present disclosure.

As illustrated in FIG. 4, the device 12 is in the form of a general-purpose computing apparatus. The device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 12 may include multiple kinds of computer-readable media. These media may be any storage media accessible by the device 12, including transitory or non-transitory storage medium and movable or unmovable storage medium.

The system memory 28 may include a computer-readable medium in a form of volatile memory, such as a random access memory (RAM) 30 and/or a high-speed cache memory 32. The device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 4, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The system memory 28 may include at least one program product, which has a set of (for example at least one) program modules configured to perform the functions of embodiments of the present disclosure.

A program/application 40 with a set of (at least one) program modules 42 may be stored in the system memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The device 12 may also communicate with one or more external devices 14 (e.g., a keyboard, a pointing device, a display 24, and etc.) and may also communicate with one or more devices that enables a user to interact with the computer system/server 12, and/or any device (e.g., a network card, a modem, and etc.) that enables the computer system/server 12 to communicate with one or more other computing devices. This kind of communication can be achieved by the input/output (I/O) interface 22. In addition, the device 12 may be connected to and communicate with one or more networks such as a local area network (LAN), a wide area network (WAN) and/or a public network such as the Internet through a network adapter 20. As shown in FIG. 4, the network adapter 20 communicates with other modules of the device 12 over bus 18. It should be understood that although not shown in the figure, other hardware and/or software modules may be used in combination with the device 12, which including, but not limited to, microcode, device drivers, redundant processing units, external disk drive arrays, RAID systems, tape drives, as well as data backup storage systems or the like.

The processing unit 16 can perform various functional applications and data processing by running programs stored in the system memory 28, for example, to perform the method for determining the motion vector field provided by the embodiments of the present disclosure.

Fifth Embodiment

A fifth embodiment of the present disclosure provides a computer readable storage medium having a computer program (or referred as computer executable instructions) stored thereon, wherein, when the program is executed by a processor, the program may implement the method for determining the motion vector field, comprising: determining an optical flow of a spatial point in a scene according to different frames of images acquired by an image acquisition unit; determining a movement velocity of the spatial point in the scene in a coordinate system of the image acquisition unit according to spatial point data acquired by a radar; determining a first order derivative of a projection of the spatial point on an image plane according to the spatial point data acquired by the radar; and determining a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In addition, the embodiments of the present disclosure further provide a vehicle, comprising a vehicle body, wherein the device according to any one of the embodiments of the present disclosure, and an image acquisition unit and a laser radar which are communicatively connected with the device, may be disposed in the vehicle body. The radar may be a laser radar or a millimeter wave radar.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for determining a motion vector field for a feature point of an object in a scene of the environment surrounding a vehicle, implemented in the vehicle, comprising:

determining an optical flow of a spatial point corresponding to the feature point in the scene according to different frames of images acquired by an image acquisition unit;

determining a movement velocity of the spatial point in the scene in a coordinate system of the image acquisition unit according to spatial point data acquired by a radar;

determining a first order derivative of a projection of the spatial point on an image plane according to the spatial point data acquired by the radar;

determining a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane, comprising: determining the velocity vector of the spatial point in the scene by using the following simultaneous equations:

$$\frac{dU}{dt} + J \cdot K \cdot R \cdot (V_{cam}^{global} - [\omega_{cam}^{global}]_\times \cdot X) = J \cdot K \cdot R \cdot V_{obj},$$

$$R^T \cdot \frac{dY}{dt} + V_{cam}^{global} - [\omega_{cam}^{global}]_\times \cdot X = V_{obj},$$

wherein K represents an intrinsic parameter of the image acquisition unit, R represents the rotation matrix of the image acquisition unit in the global coordinate system, $V_{cam}^{global}$ represents the movement velocity of the image acquisition unit, $\omega_{cam}^{global}$ represents the angular velocity of the image acquisition unit, X represents the pose of the spatial point in the scene, $$\frac{dU}{dt}$$

represents the optical flow of the spatial point, $$\frac{dY}{dt}$$

represents the movement velocity of the spatial point in the coordinate system of the image acquisition unit, J represents the first order derivative of the projection of the spatial point on the image plane, $[\ ]_\times$ represents an inverse symmetric matrix operation, and $V_{obj}$ represents the velocity vector of the spatial point in the scene; and adjusting a driving direction and a driving velocity of the vehicle based on the velocity vector of the spatial point in the scene to elude the object in the scene of the environment surrounding the vehicle, wherein the velocity vector of the spatial point in the scene represents a moving direction and a moving velocity of the object in the scene of the environment surrounding the vehicle.

2. The method of claim 1, wherein determining the movement velocity of the spatial point in the scene in the coordinate system of the image acquisition unit according to the spatial point data acquired by the radar comprises:

determining a movement velocity of the spatial point in the global coordinate system according to data from a millimeter wave radar at different time points; and converting the movement velocity of the spatial point in the global coordinate system into the movement velocity in the coordinate system of the image acquisition unit according to a relative pose between the millimeter wave radar and the image acquisition unit.

3. The method of claim 1, wherein determining the movement velocity of the spatial point in the scene in the coordinate system of the image acquisition unit according to the spatial point data acquired by the radar comprises:

projecting point cloud data of the spatial point onto the image plane according to a relative pose between a laser radar and the image acquisition unit, to obtain a depth image; and obtaining the movement velocity of the spatial point in the coordinate system of the image acquisition unit according to the depth images at different time points.

4. An apparatus for determining a motion vector field for a feature point of an object in a scene of the environment surrounding a vehicle, implemented in the vehicle, comprising:

one or more processors; and a memory configured to store one or more programs, wherein when the one or more programs are executed by the one or more processors, the one or more processors are configured to implement a method for determining the motion vector field, comprising:

determining an optical flow of a spatial point corresponding to the feature point in the scene according to different frames of images acquired by an image acquisition unit;

determining a movement velocity of the spatial point in the scene in a coordinate system of the image acquisition unit according to spatial point data acquired by a radar;

determining a first order derivative of a projection of the spatial point on an image plane according to the spatial point data acquired by the radar;

determining a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane, comprising: determining the velocity vector of the spatial point in the scene by using the following simultaneous equations:

$$\frac{dU}{dt} + J \cdot K \cdot R \cdot (V_{cam}^{global} - [\omega_{cam}^{global}]_\times \cdot X) = J \cdot K \cdot R \cdot V_{obj},$$

$$R^T \cdot \frac{dY}{dt} + V_{cam}^{global} - [\omega_{cam}^{global}]_\times \cdot X = V_{obj},$$

wherein K represents an intrinsic parameter of the image acquisition unit, R represents the rotation matrix of the image acquisition unit in the global coordinate system, $V_{cam}^{global}$ represents the movement velocity of the image acquisition unit, $\omega_{cam}^{global}$ represents the angular velocity of the image acquisition unit, X represents the pose of the spatial point in the scene, $$\frac{dU}{dt}$$

represents the optical flow of the spatial point, $$\frac{dY}{dt}$$

represents the movement velocity of the spatial point in the coordinate system of the image acquisition unit, J represents the first order derivative of the projection of the spatial point on the image plane, $[\ ]_\times$ represents an inverse symmetric matrix operation, and $V_{obj}$ represents the velocity vector of the spatial point in the scene; and adjusting a driving direction and a driving velocity of the vehicle based on the velocity vector of the spatial point in the scene to elude the object in the scene of the environment surrounding the vehicle, wherein the velocity vector of the spatial point in the scene represents a moving direction and a moving velocity of the object in the scene of the environment surrounding the vehicle.

5. The apparatus of claim 4, wherein when the one or more processors are configured to determine the movement velocity of the spatial point in the scene in the coordinate system of the image acquisition unit according to the spatial point data acquired by the radar, the one or more processors are configured:

to determine a movement velocity of the spatial point in the global coordinate system according to data from a millimeter wave radar at different time points; and to convert the movement velocity of the spatial point in the global coordinate system into the movement velocity in the coordinate system of the image acquisition unit according to a relative pose between the millimeter wave radar and the image acquisition unit.

6. The apparatus of claim 4, wherein when the one or more processors are configured to determine the movement velocity of the spatial point in the scene in the coordinate system of the image acquisition unit according to the spatial point data acquired by the radar, the one or more processors are configured:

to project point cloud data of the spatial point onto the image plane according to a relative pose between the laser radar and the image acquisition unit, to obtain a depth image; and to obtain the movement velocity of the spatial point in the coordinate system of the image acquisition unit according to the depth images at different time points.

7. A non-transitory computer readable storage medium having a computer program stored thereon, wherein when the program is executed by a processor in a vehicle, the program implements a method for determining the motion vector field for a feature point of an object in a scene of the environment surrounding a vehicle and implemented in the vehicle, the method comprising:

determining an optical flow of a spatial point corresponding to the feature point in the scene according to different frames of images acquired by an image acquisition unit;

determining a movement velocity of the spatial point in the scene in a coordinate system of the image acquisition unit according to spatial point data acquired by a radar;

determining a first order derivative of a projection of the spatial point on an image plane according to the spatial point data acquired by the radar;

determining a velocity vector of the spatial point in the scene according to intrinsic parameters of the image acquisition unit, a rotation matrix of the image acquisition unit in a global coordinate system, a movement velocity of the image acquisition unit, an angular velocity of the image acquisition unit, a pose of the spatial point in the scene, the optical flow of the spatial point, the movement velocity of the spatial point in the coordinate system of the image acquisition unit, and the first order derivative of the projection of the spatial point on the image plane, comprising: determining the velocity vector of the spatial point in the scene by using the following simultaneous equations:

$$\frac{dU}{dt} + J \cdot K \cdot R \cdot (V_{cam}^{global} - [\omega_{cam}^{global}]_\times \cdot X) = J \cdot K \cdot R \cdot V_{obj},$$

$$R^T \cdot \frac{dY}{dt} + V_{cam}^{global} - [\omega_{cam}^{global}]_\times \cdot X = V_{obj},$$

wherein K represents an intrinsic parameter of the image acquisition unit, R represents the rotation matrix of the image acquisition unit in the global coordinate system, $V_{cam}^{global}$ represents the movement velocity of the image acquisition unit, $\omega_{cam}^{global}$ represents the angular velocity of the image acquisition unit, X represents the pose of the spatial point in the scene, $$\frac{dU}{dt}$$

represents the optical flow of the spatial point, $$\frac{dY}{dt}$$

represents the movement velocity of the spatial point in the coordinate system of the image acquisition unit, J represents the first order derivative of the projection of the spatial point on the image plane, $[\ ]_\times$ represents an inverse symmetric matrix operation, and $V_{obj}$ represents the velocity vector of the spatial point in the scene; and adjusting a driving direction and a driving velocity of the vehicle based on the velocity vector of the spatial point in the scene to elude the object in the scene of the environment surrounding the vehicle, wherein the velocity vector of the spatial point in the scene represents a moving direction and a moving velocity of the object in the scene of the environment surrounding the vehicle.

8. The non-transitory computer readable storage medium of claim 7, wherein determining the movement velocity of the spatial point in the scene in the coordinate system of the image acquisition unit according to the spatial point data acquired by the radar comprises:

determining a movement velocity of the spatial point in the global coordinate system according to data from a millimeter wave radar at different time points; and converting the movement velocity of the spatial point in the global coordinate system into the movement velocity in the coordinate system of the image acquisition unit according to a relative pose between the millimeter wave radar and the image acquisition unit.

9. The non-transitory computer readable storage medium of claim 7, wherein determining the movement velocity of the spatial point in the scene in the coordinate system of the image acquisition unit according to the spatial point data acquired by the radar comprises:

projecting point cloud data of the spatial point onto the image plane according to a relative pose between a laser radar and the image acquisition unit, to obtain a depth image; and obtaining the movement velocity of the spatial point in the coordinate system of the image acquisition unit according to the depth images at different time points.

* * * * *